(12) United States Patent
Nava Reyes

(10) Patent No.: US 11,433,841 B2
(45) Date of Patent: Sep. 6, 2022

(54) TRUCK BRACKET ASSEMBLY

(71) Applicant: NISSAN NORTH AMERICA, INC., Franklin, TN (US)

(72) Inventor: Emmanuel Agustín Nava Reyes, Metepec (MX)

(73) Assignee: NISSAN NORTH AMERICA, INC., Franklin, TN (US)

( * ) Notice: Subject to any disclaimer, the term of this patent is extended or adjusted under 35 U.S.C. 154(b) by 0 days.

(21) Appl. No.: 17/129,634

(22) Filed: Dec. 21, 2020

(65) Prior Publication Data
US 2022/0194311 A1  Jun. 23, 2022

(51) Int. Cl.
*B60R 21/13* (2006.01)
*B62D 27/02* (2006.01)
*B62D 33/02* (2006.01)

(52) U.S. Cl.
CPC ............ *B60R 21/13* (2013.01); *B62D 27/023* (2013.01); *B62D 33/02* (2013.01)

(58) Field of Classification Search
CPC ........ B60R 21/13; B62D 27/023; B62D 33/02
USPC ........................................................ 280/756
See application file for complete search history.

(56) References Cited

U.S. PATENT DOCUMENTS

| | | | | |
|---|---|---|---|---|
| 4,405,170 A * | 9/1983 | Raya | ......................... | B60P 3/42 224/309 |
| 4,795,188 A * | 1/1989 | Dueker | ................... | B60R 21/13 280/756 |
| 4,900,058 A * | 2/1990 | Hobrecht | ................ | B60R 21/13 280/756 |
| 5,000,480 A * | 3/1991 | Straka | .................. | B60Q 1/2611 280/756 |
| 5,326,142 A * | 7/1994 | Dodds | .................. | B60Q 1/2611 180/68.6 |
| 6,971,563 B2 * | 12/2005 | Levi | ......................... | B60P 3/40 224/403 |
| 7,025,524 B2 * | 4/2006 | Vitoorapakorn | ........ | B60R 13/01 403/408.1 |
| 7,296,837 B2 * | 11/2007 | Niedziela | .................. | B60P 3/40 224/405 |
| 7,497,493 B1 * | 3/2009 | Thiessen | ................... | B60P 7/15 296/3 |
| 8,157,229 B2 * | 4/2012 | Palermo | ................ | B60P 7/0815 248/231.71 |
| 9,566,914 B2 * | 2/2017 | Marr, Jr. | ............ | B62D 33/0207 |
| 9,914,403 B1 * | 3/2018 | Richardson | .......... | B60Q 1/2657 |
| 2019/0291673 A1 * | 9/2019 | Ajam | ...................... | B60R 21/13 |

OTHER PUBLICATIONS

Nissan support bracket sold prior to Jan. 2021.

* cited by examiner

*Primary Examiner* — Toan C To
(74) *Attorney, Agent, or Firm* — Global IP Counselors, LLP

(57) ABSTRACT

A truck bracket assembly including a first bracket and a second bracket. The first bracket is provided to mount a sports bar to a side panel of a vehicle truck bed. The first bracket has a panel facing surface that faces the side panel. The second bracket has a first portion supported to the panel facing surface of the first bracket. The second bracket has a second portion that extends cantilevered with respect to the first portion.

18 Claims, 5 Drawing Sheets

TRUCK BRACKET ASSEMBLY

BACKGROUND

Field of the Invention

The present invention generally relates to a truck bracket assembly. More specifically, the present invention relates to a truck bracket assembly for mounting to a vehicle truck bed.

Background Information

Vehicles can be equipped with a sports bar (or roll bar) that is mounted to the vehicle's cargo box via a sports bar bracket. The sports bar typically can be equipped with lights or illumination assemblies for illuminating the cargo area. Equipment can be secured to the cargo area by being strapped to the sports bar. Therefore, the sports bar can provide an additional layer of safety and security for the stored objects in the cargo area.

SUMMARY

In view of the state of the known technology, one aspect of the present disclosure is to provide a truck bracket assembly comprising a first bracket and a second bracket. The first bracket is provided to mount a sports bar to a side panel of a vehicle truck bed. The first bracket has a panel facing surface that faces the side panel. The second bracket has a first portion supported to the panel facing surface of the first bracket. The second bracket has a second portion that extends cantilevered with respect to the first portion.

In view of the state of the known technology, another aspect of the present disclosure is to provide a vehicle comprising a truck bed, a first bracket and a second bracket. The truck bed has a side panel that includes an inner panel and an outer panel. The first bracket is supported to the outer panel of the side panel. The second bracket is supported to the inner panel of the side panel. The second bracket contacts a pair of cantilevered surfaces of the inner panel.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
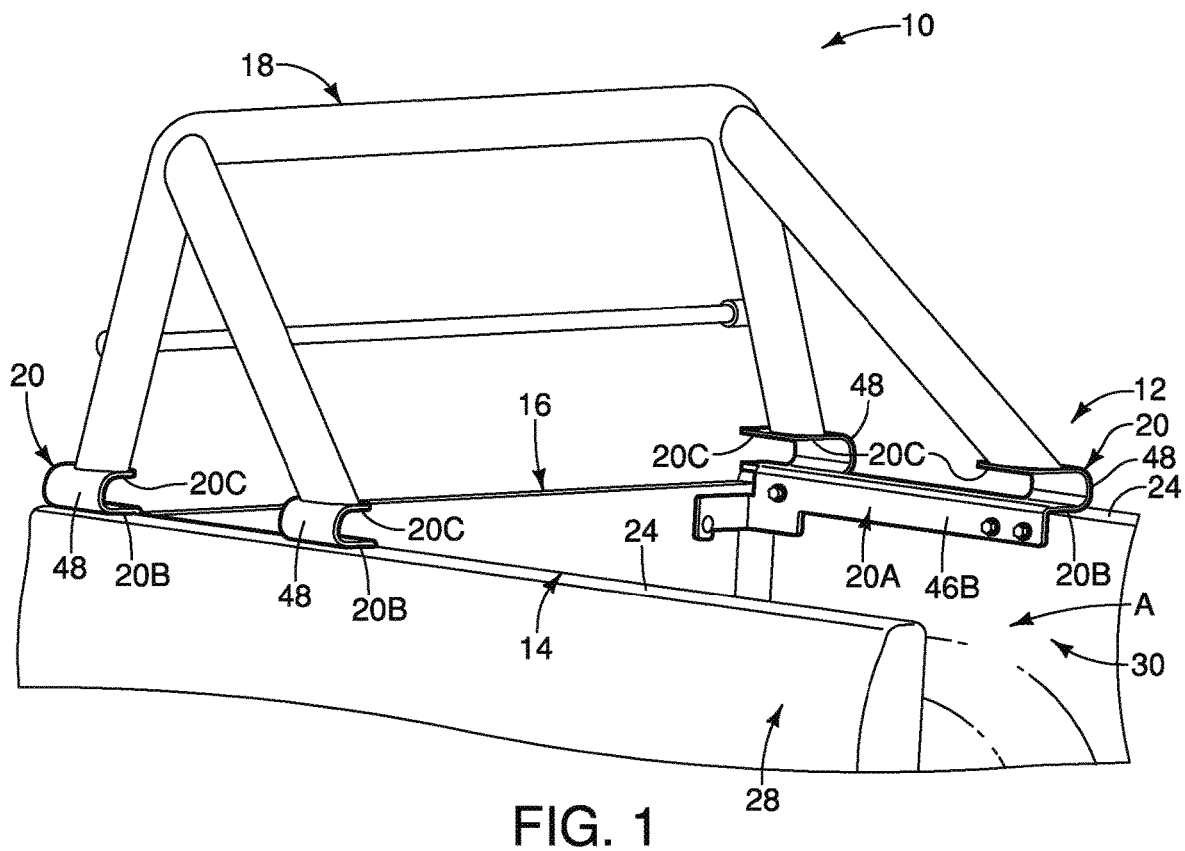
FIG. 1 is a perspective view of a portion of a vehicle truck bed that is equipped with a truck bracket assembly in accordance with an illustrated embodiment.
Figure 2:
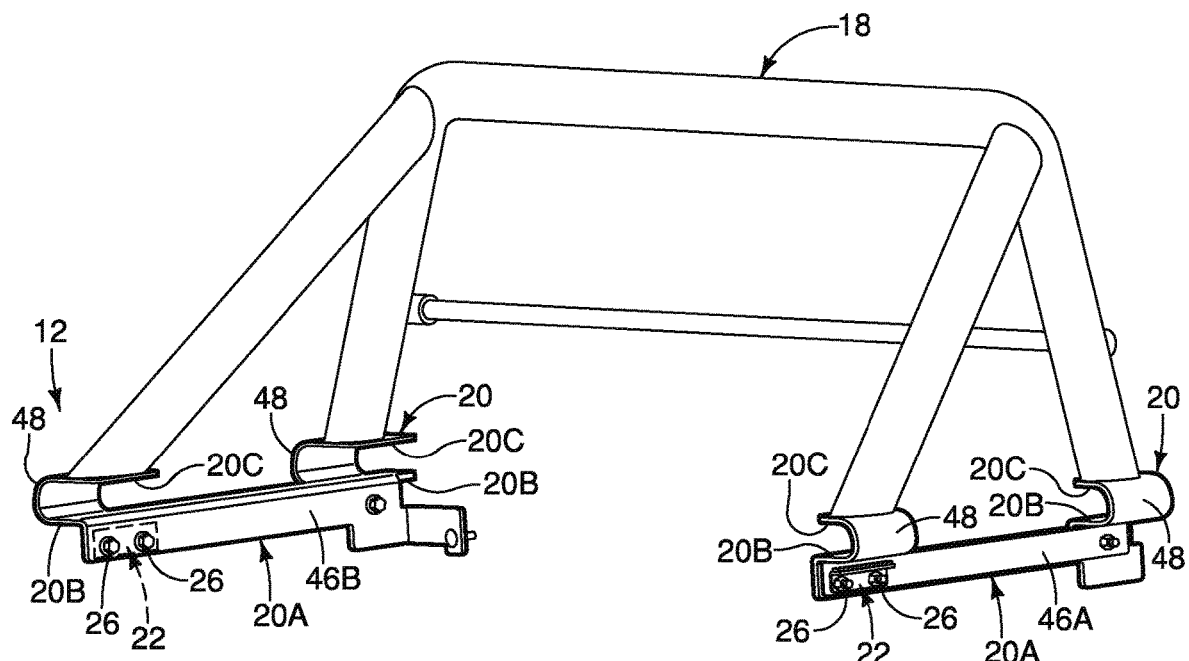
FIG. 2 is a perspective view of the truck bracket assembly of FIG. 1 supporting a vehicle sports bar.

Referring initially to FIG. 1, a portion of a vehicle 10 is illustrated as being equipped with a truck bracket assembly 12 in accordance with an illustrated embodiment. As shown, the vehicle 10 comprises a truck bed 14 (cargo box) and the truck bracket assembly 12 that is assembled to the truck bed 14. The truck bed 14 is part of a vehicle body 16 of the vehicle 10. Thus, the vehicle 10 is equipped with one or more accessories that are compatible for use with the truck bed 14. For example, as seen in FIGS. 1 and 2, the vehicle 10 is illustrated as being equipped with a sports bar 18 (or roll bar) that is mounted to the truck bed 14 via the truck bracket assembly 12. The sports bar 18 typically can be equipped with lights or illumination assemblies for illuminating a cargo area A defined by the truck bed 14. Equipment can be secured to the cargo area A by being strapped to the sports bar 18. Therefore, the sports bar 18 provides an additional layer of safety and security for the stored objects in the cargo area A.

Figure 3:
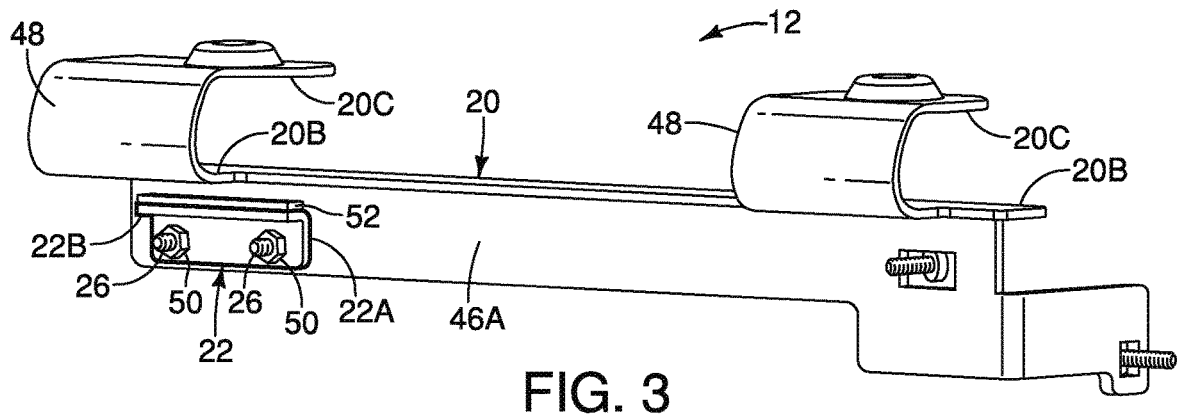
FIG. 3 is a perspective view of the truck bracket assembly of FIGS. 1 and 2.
Figure 4:
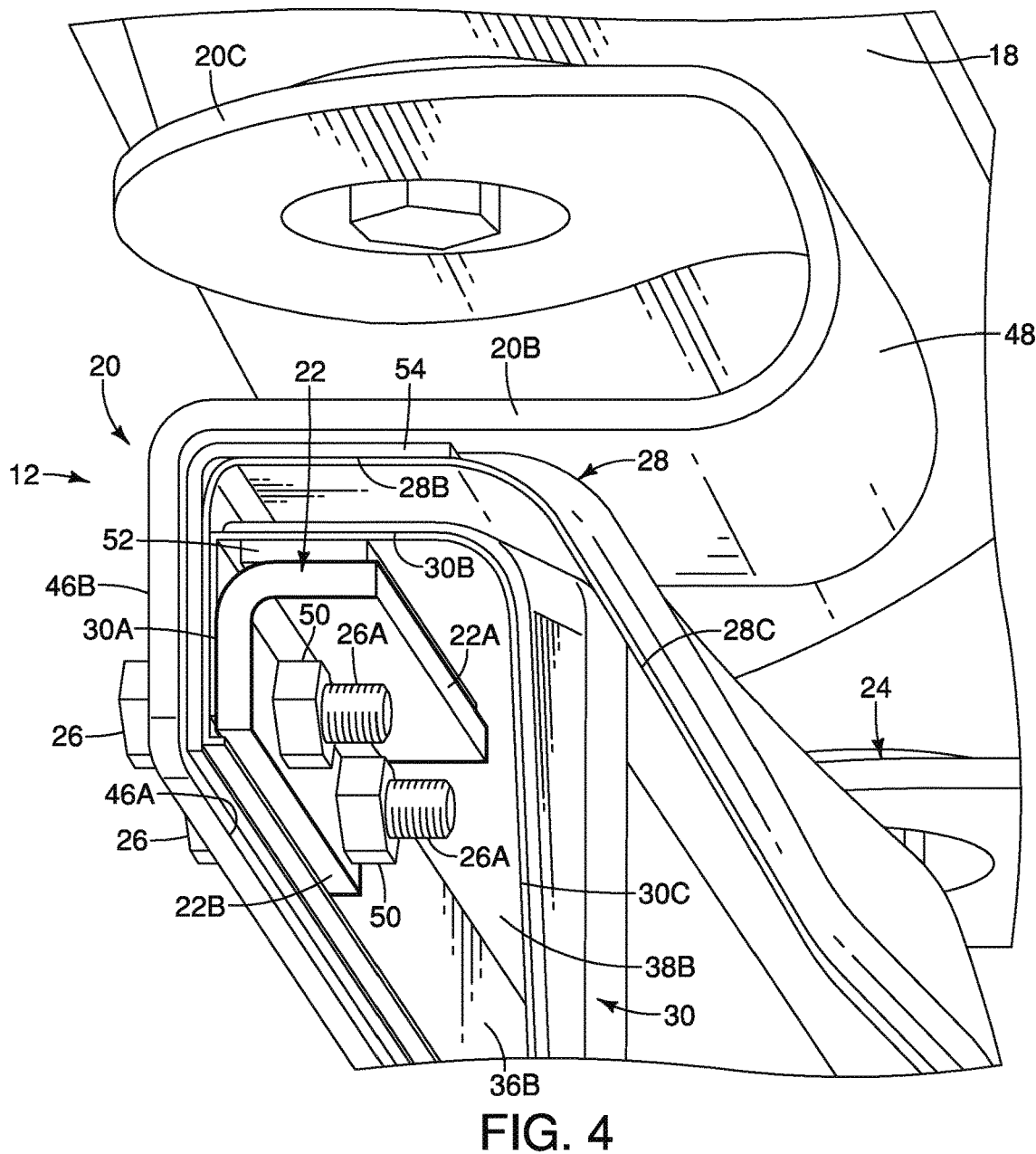
FIG. 4 is an enlarged side view of the truck bracket assembly of FIG. 3.
Figure 5:
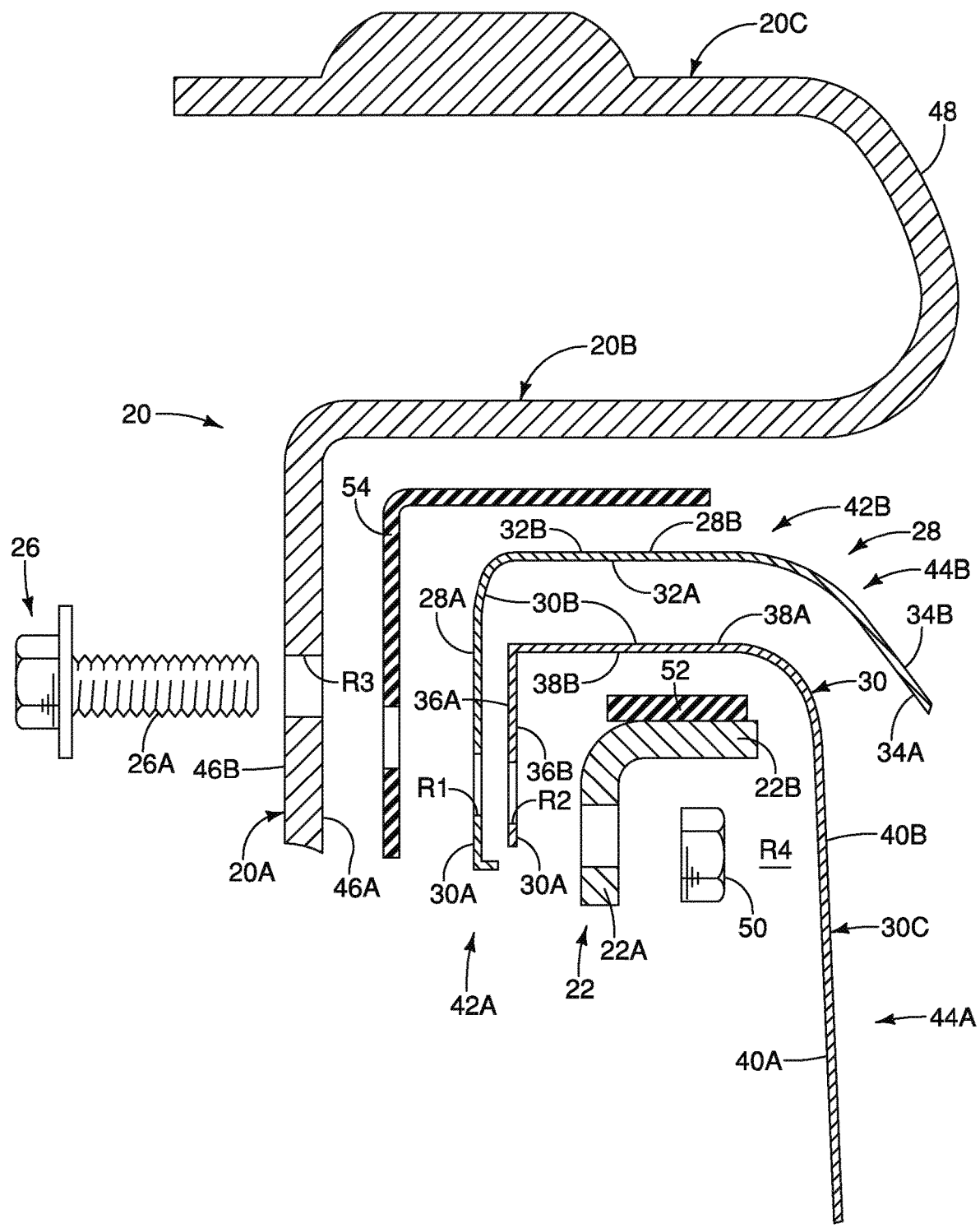
FIG. 5 is an exploded view of a cross-section of the truck bracket assembly of FIG. 3.
Figure 6:
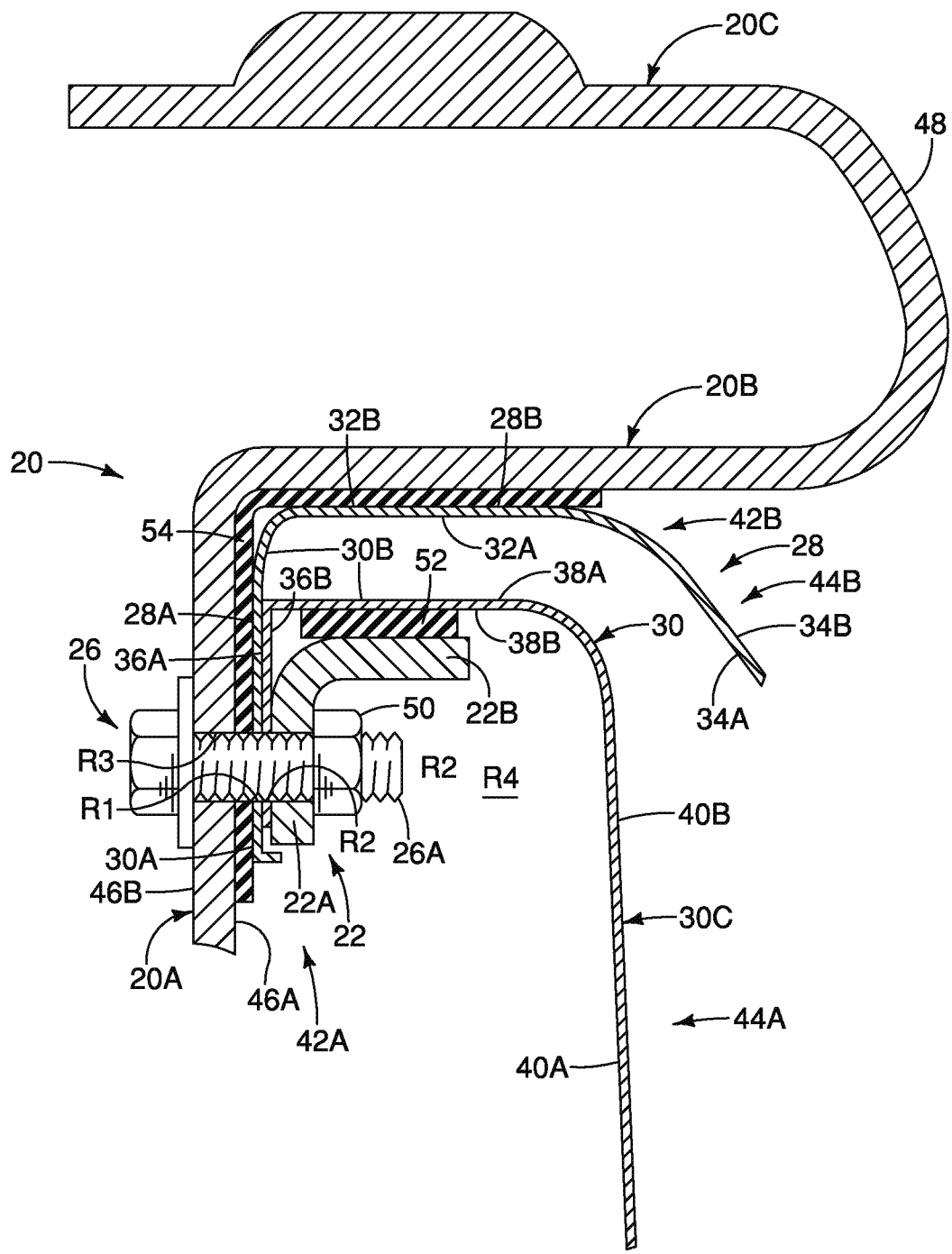
FIG. 6 is a cross-sectional view of the truck bracket assembly of FIG. 3.

In the illustrated embodiment, the truck bracket assembly 12 comprises a first bracket 20 and a second bracket 22. The first bracket 20 mounts the sports bar 18 to the truck bed 14. That is, the first bracket 20 supports the sports bar 18 directly to a side panel 24 of the truck bed 14. As seen in FIGS. 4 to 6, the second bracket 22 is provided to the first bracket 20 between the first bracket 20 and the truck bed 14. As seen in FIGS. 2 and 3, the second bracket 22 is provided to the first bracket 20 at a forward facing side of the first bracket 20. That is, the second bracket 22 is provided to the first bracket 20 at a location of the first bracket 20 that is closer to a front of the vehicle 10. The second bracket 22 is positioned and dimensioned to reduce stress to the vehicle body 16 due to contact between the first bracket 20 and the vehicle body 16 during use, as will be further described below.

As seen in FIGS. 1 and 2, the vehicle 10 includes a pair of first brackets 20 that are fixed to opposite lateral sides of the truck bed 14 to support both sides of the sports bar 18 to the truck bed 14. Therefore, the vehicle 10 includes the pair of first brackets 20. The vehicle 10 further includes a pair of second brackets 22, each of the second brackets 22 are supported to one of the first brackets 20. In the illustrated embodiment, the first brackets 20 are identical with respect to each other. Therefore only one of the first brackets 20 will be further described for brevity. Similarly, the second brackets 22 are identical with respect to each other. Therefore, only one of the second brackets 22 will be further described for brevity.

As best seen in FIGS. 1, 2 and 4, the first and second brackets 20 and 22 are supported to the side panel 24 via fasteners 26. In particular, the first and second brackets 20 and 22 are supported to the side panel 24 by a pair of fasteners 26. Therefore, the vehicle 10 further includes at least one fastener 26 that is part of the truck bracket assembly 12. Thus, the truck bracket assembly 12 further includes at least one fastener 26. More particularly, the truck bracket assembly 12 further includes the pair of fasteners 26. As best seen in FIGS. 4 to 6, the fasteners 26 extends through a portion of the side panel 24, through the first bracket 20 and through the second bracket 22 to support the first and second brackets 20 and 22 to the side panel 24. While the fasteners 26 are illustrated as being threaded bolts, it will be apparent to those skilled in the vehicle field from this disclosure that the fasteners 26 can be screws or rivets.

While the truck bracket assembly 12 is illustrated as including the pair of fasteners 26, it will be apparent to those skilled in the vehicle field from this disclosure that the truck bracket assembly 12 can include a single fastener 26 that supports the first and second brackets 20 and 22 to the side panel 24. Alternatively, will be apparent to those skilled in the vehicle field from this disclosure that the truck bracket assembly 12 can include additional fasteners 26 for supporting the first and second brackets 20 and 22 to the side panel 24.

Referring to FIGS. 1, 2, 4 and 5, the side panel 24 of the truck bed 14 includes an outer panel 28 and an inner panel 30 that are fixed to each other in a conventional manner such as by hooks, clips and/or other types of fasteners 26. The side panel 24 is formed by the outer panel 28 and the inner panel 30 that together extend in a longitudinal direction of the vehicle to define a side of the truck bed 14. The truck bed 14 has a floor panel (not shown) extending between the side panel 24. The outer and inner panels 28 and 30 are made of stamped steel. The outer and inner panels 28 and 30 receive the fasteners 26 therethrough.

Referring to FIGS. 5 and 6, the outer panel 28 includes a first portion 28A, a second portion 28B and a third portion 28C. The first, second and third portions 28A-C together have a shape that substantially corresponds to a shape of a mounting portion 20A of the first bracket 20 that is mounted to the side panel 24. That is, the first, second and third portions 28A-C of the outer panel 28 are fitted to the mounting portion of the first bracket 20, as will be further described below. In particular, as best seen in FIG. 1, the first portion 28A is positioned closer to the cargo area A than the second and third portion 28Cs are positioned to the cargo area A.

The third portion 28C is positioned exteriorly away from the cargo area A with respect to the first and second portions 28A and 28B. The second portion 28B connects the first and third portion 28C. The first portion 28A preferably curves outwards away from the cargo area A to the second portion 28B. The second portion 28B curves outwardly away from the cargo area A to the third portion 28C. The first, second and third portions 28A-C are preferably together integrally formed as a one-piece member. The first, second and third portions 28A-C are preferably made of a rigid material such as stamped steel.

As best seen in FIGS. 5 and 6, the first portion 28A of the outer panel 28 has an inside facing surface 30A that faces the cargo area A. The first portion 28A has an outside facing surface 30B that is oppositely facing of the inside facing surface 28A. In particular, the outside facing surface 30B faces the inner panel 30. As shown, the outside facing surface 30B preferably directly contacts an inside facing surface 36A of the inner panel 30. The first portion 28A preferably has a hook that hooks outwardly away from the first portion 28A towards the inner panel 30. As best seen in FIG. 4, the first portion 28A has a pair of first receiving openings R1 (only one shown in FIGS. 5 and 6) that receives the fasteners 26 through the first portion 28A of the outer panel 28.

The second portion 28B of the outer panel 28 has an inner panel facing surface 32A that faces downward towards the inner panel 30. The second portion 28B has an upward facing surface 32B that is opposite of the inner panel facing surface 32A. The upward facing surface 32B faces the away from the inner panel 30 and towards the sports bar 18 when the sports bar 18 is supported to the truck bracket assembly 12. The first and second portions 28A and 28B of the outer panel 28 extend substantially transverse (i.e., at right angles) with respect to each other. Therefore, the first and second portions 28A and 28B of the outer panel 28 form a pair of cantilevered surfaces with respect to each other.

The third portion 28C of the outer panel 28 includes an inside facing surface 34A that faces the inner panel 30. The third portion 28C has an outside facing surface 34B that is oppositely facing of the inside facing surface 34A. The outside facing surface 34B faces the vehicle 10 exterior. The third portion 28C defines an exterior surface of the vehicle body 16, as seen in FIG. 1.

Referring to FIGS. 4 to 6, the inner panel 30 has a first portion 30A, a second portion 30B and a third portion 30C. The first, second and third portions 30A-C of the inner panel 30 together have a shape that substantially corresponds to the first, second and third portions 30A-C of the outer panel 28. That is, the first, second and third portions 30A-C of the inner panel 30 are fitted to the outer panel 28. In particular, as best seen in FIG. 4, the first portion 30A is positioned closer to the cargo area A than the second and third portions 30B and 30C are positioned to the cargo area A. The third portion 30C is positioned exteriorly away from the cargo area A with respect to the first and second portions 30A and 30B. The second portion 30B connects the first and third portions and 30A and 30C. The first portion 30A preferably curves exteriorly away from the cargo area A to the second portion 30B. The second portion 30B curves outwardly exteriorly away from the cargo area A towards the third portion 30C. The first, second and third portions 30A-C are preferably together integrally formed as a one-piece member that is made of stamped steel.

Referring primarily to FIG. 5, the first portion 30A of the inner panel 30 has an inside facing surface 36A that faces towards the cargo area A. In particular, the inside facing surface 36A contacts the first portion 30A of the outer panel 28. The first portion 30A has an outside facing surface 36B that is oppositely facing of the inside facing surface 36B. In particular, the outside facing surface 36B faces the second bracket 22. As shown, the outside facing surface 36B directly contacts the second bracket 22, as will be further described. As best seen in FIG. 4, the first portion 30A of the inner panel 30 has a pair of second receiving openings R2 (only one shown in FIGS. 5 and 6) that are aligned with the first receiving openings R1 of the outer panel 28. The second receiving openings R2 receive the fasteners 26 through the first portion 30A of the inner panel 30 to fix the outer and inner panels 28 and 30 to the truck bracket assembly 12.

The first and second portions 30A and 30B of the inner panel 30 extend substantially transverse (i.e., at right angles) with respect to each other. Therefore, the first and second portions 30A and 30B of the outer panel 28 form a pair of cantilevered surfaces with respect to each other. The second portion 30B of the inner panel 30 has an outer panel facing surface 38A that is upward facing towards the second portion 30B of the outer panel 28. The second portion 30B has a second bracket facing surface 38B that is downward facing towards the second bracket 22.

The third portion 30C of the inner panel 30 extends substantially parallel to the first portion 30A of the outer panel 28. The third portion 30C forms an inside surface of the truck bed 14. That is, the third portion 30C of the inner panel 30 includes an inside facing surface 40A that faces the cargo area A. The third portion 30C has an outside facing surface 40B that is opposite of the inside facing surface 40A that faces towards the outer panel 28.

In the illustrated embodiment, the first portions 28A and 30A of the outer and inner panels 28 and 30 directly contact each other. The second portions 28B and 30B of the outer and inner panels 28 and 30 are spaced from each other. The third portions 28C and 30C of the outer and inner panels 28 and 30 are spaced from each other. Therefore, in the truck bracket assembly 12 of the illustrated embodiment, the first portion 30A of the inner panel 30 is part of an interior portion 42A of the inner panel 30. The first portion 28A of the outer panel 28 is part of an interior portion 42B of the outer panel 28. In the illustrated embodiment, the interior portion 42A of the inner panel 30 includes both the first and second portions 30A and 30B of the inner panel 30. The interior portion 42B of the outer panel 28 includes both the first and second portions 28A and 28B of the outer panel 28. Thus, in the illustrated embodiment, the interior portion 42A of the inner panel 30 and the interior portion 42B of the outer panel 28 are sandwiched between the first and second brackets 20 and 22.

As best seen in FIG. 5, the truck bracket assembly 12 of the illustrated embodiment, the third portion 30C of the inner panel 30 is part of an exterior portion 44A of the inner panel 30. The third portion 28C of the outer panel 28 is part of an exterior portion 44B of the outer panel 28. Therefore, the exterior portion 44A of the inner panel 30 and the exterior portion 44B of the outer panel 28 extend in a vehicle outward direction away from the first and second brackets 20 and 22. As shown, the second bracket 22 is positioned laterally between the first and third portions 28A and 28C of the inner panel 30. Alternatively speaking, the second bracket 22 is positioned laterally between the interior portion 42A and the exterior portion 44A of the inner panel 30.

As shown in FIGS. 5 and 6, the first bracket 20 of the truck bracket assembly 12 is supported to the outer panel 28 of the side panel 24. As best seen in FIGS. 2 and 4, the first bracket 20 includes a first mounting portion 20A that is mounted to the side panel 24 of the truck bed 14. The first mounting portion 20A has a panel facing surface 46A that faces the side panel 24, particularly the outer panel 28. The first mounting portion 20A has a shape that corresponds to the shape of the first portions of the outer and inner panels 28 and 30. The first mounting portion 20A includes a pair of third receiving openings R3 for receiving the fasteners 26 for securing the first bracket 20 to the side panel 24 and to the second bracket 22. The panel facing surface 46A faces towards the first portions 28A and 30A of the outer and inner panels 28 and 30. The first mounting portion 20A has an inside facing surface 46B that is opposite of the panel facing surface 46A to face the cargo area A.

The first bracket 20 has a second mounting portion 20B that is cantilevered with respect to the first mounting portion 20A. The first and second mounting portions 20A and 20B of the first bracket 20 has an overall shape that substantially corresponds to the interior portions 42A and 42B of the outer and inner panels 28 and 30. The second mounting portion 20B has a sports bar support portion 20C that extends upwardly from the second mounting portion 20B to support the sports bar 18. As best seen in FIG. 4, the sports bar support portion 20C extends cantilevered with respect to the panel facing surface 46A. Therefore, the sports bar support portion 20C extends in the same direction (i.e., outwardly away from the cargo area A) as the direction that the second portion 22B of the second bracket 22 extends from the first portion 22A of the second bracket 22. As best seen in FIGS. 1 to 3, the sports bar support portion 20C includes a pair of curved protrusions 48 extending from the second mounting portion 20B to support the sports bar 18.

The second bracket 22 is provided to the first bracket 20 to help reduce stress caused by the first bracket 20 contacting the vehicle body 16 during driving. That is, the second bracket 22 is provided to the first bracket 20 so to help support the first bracket 20 to the side panel 24 while reducing movement of the second bracket 22 upwards in order to avoid damage to the side panel 24. Thus, the second bracket 22 of the illustrated embodiment contacts a pair of cantilevered surfaces of the truck bed 14, as will be further discussed below. That is, the second bracket 22 is an L-shaped bracket that contacts the cantilevered surfaces of the first and second portions 30A and 30B of the inner panel 30.

The second bracket 22 has a first portion 22A and a second portion 22B. The first and second portions 22A and 22B together form the L-shape of the second bracket 22. The first portion 22A of the second bracket 22 is supported to the panel facing surface 46A of the first bracket 20. As best seen in FIGS. 2 and 3, the first portion 22A is supported at the panel facing surface 46 of the first bracket 20. As best seen in FIGS. 4 to 6, the first portion 22A of the second bracket 22 directly contacts the inner panel 30. Thus, the first portion 22A of the second bracket 22 is directly mounted to the first portion 30A of the inner panel 30. Preferably, the first and second portions 22A and 22B of the second bracket 22 are integrally formed as a one-piece member, as best seen in FIG. 4. That is, the first and second portions 22A and 22B are rigid members made of stamped steel that is molded together or welded together. However, it will be apparent to those skilled in the vehicle field from this disclosure that the first and second portions 22A and 22B of the second bracket 22 can be separately formed and detachably attached.

As best seen in FIG. 5, the first portion 22A of the second bracket 22 has at least one receiving opening R5 that corresponds to the receiving openings R1, R2 of the outer and inner panels 28 and 30, and also the receiving opening R3 of the first bracket 20. That is, the second bracket 22 also includes a pair of receiving openings R4 for receiving the fasteners 26. As best seen in FIGS. 3 and 4, the truck bracket assembly 12 further comprises a pair of weld nuts 50 for receiving the fasteners 26. In the illustrated embodiment, the weld nuts 50 are welded to the second bracket 22. The weld nut 50 receives the threaded portions 26A of the fasteners 26 therethrough.

The second portion 22B of the second bracket 22 extends transverse with respect to the first portion 22A to form substantially a right angle with the first portion 22B. The second portion 22B extends cantilevered with respect to the first portion 22A. Therefore, the first and second portions 22A and 22B of the second bracket 22 contacts a pair of cantilevered surfaces (e.g., the first and second portions 30A and 30B) of the inner panel 30. The second portion 22B of the second bracket 22 is configured to push up against the second portion 30B of the inner panel 30 when the vehicle 10 that is equipped with the truck bracket assembly 12 is in use. That is, the second portion 22B of the second bracket 22 forms a stop for the truck bracket assembly 12 that prevents the truck bracket assembly 12 from upward movement to reduce damage and stress to the side panel 24.

As best seen in FIGS. 5 and 6, the truck bracket assembly 12 further comprises a first deformable member 52 that is sandwiched between the second bracket 22 and the inner panel 30. In particular, the first deformable member 52 is sandwiched between the second portion 22B of the second bracket 22 and the second portion 30B of the inner panel 30. The first deformable member 52 is made of a non-rigid, resilient material such as polyethylene. Preferably, the first deformable member 52 is made of low-density polyethylene (LDPE). The second portion 22B of the second bracket 22 contacts the first deformable member 52 to prevent the second bracket 22 from damaging the inner panel 30 when the vehicle 10 is in use.

The truck bracket assembly 12 further comprises a second deformable member 54 that is sandwiched between the first bracket 20 and the outer panel 28. As shown, the second deformable member 54 is an L-shaped member. That is, as best seen in FIGS. 5 and 6, the second deformable member 54 is sandwiched between the first and second mounting portions 20A and 20B of the first bracket 20 and the first and second portions 28A and 28B of the outer panel 28. The second deformable member 54 is made of a non-rigid, resilient material such as polyethylene. Preferably, the second deformable member 54 is made of low-density polyethylene (LDPE).

Figure 7:
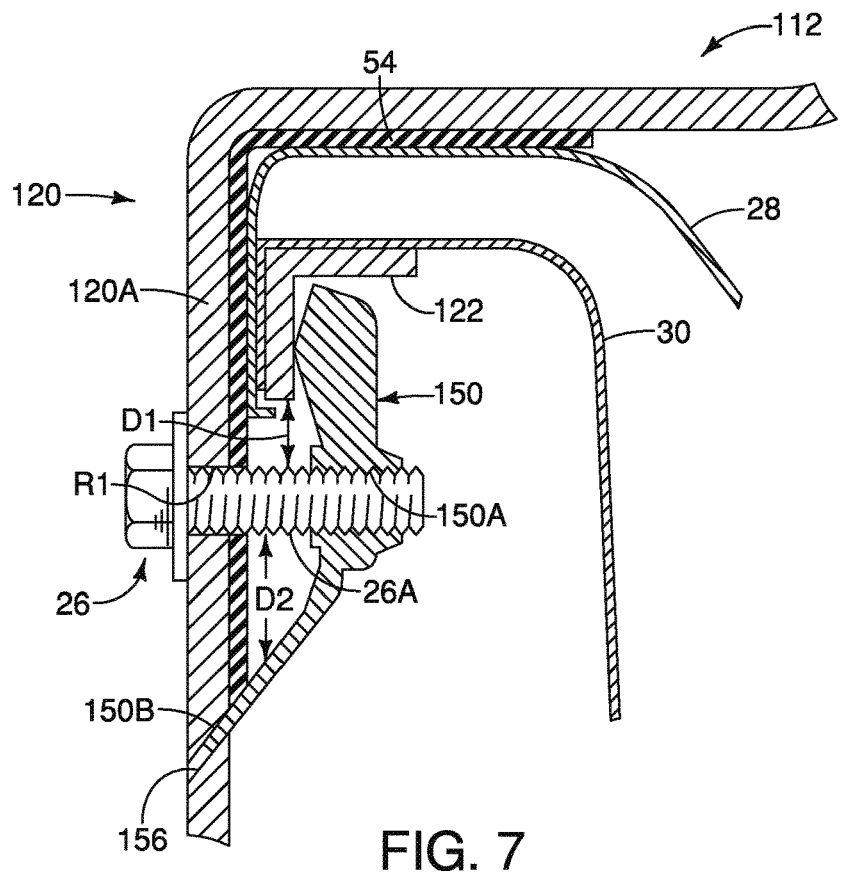
FIG. 7 is a cross-sectional view of a first modified truck bracket assembly.

Referring now to FIG. 7, a first modified truck bracket assembly 112 that can be provided to the vehicle 10 is illustrated in accordance with another embodiment. In particular, the first modified truck bracket assembly 112 supports the sports bar 18 to the side panel 24 of the vehicle 10. The first modified truck bracket assembly 112 comprises a modified first bracket 120. The modified first bracket 120 mounts the sports bar 18 to the truck bed 14. That is, the modified first bracket 120 supports the sports bar 18 directly to the side panel 24 of the truck bed 14. The first modified truck bracket assembly 112 further comprises a modified second bracket 122. The modified second bracket 122 is provided to the modified first bracket 120 between the modified first bracket 120 and the truck bed 14. The modified second bracket 122 is positioned and dimensioned to reduce stress to the vehicle body 16 due to contact between the modified first bracket 120 and the vehicle body 16 during use, as will be further described below.

The first modified truck bracket assembly 112 further comprises a pair of fasteners 26 that are identical to the fasteners 26 of FIGS. 1 to 6. The first modified truck bracket assembly 112 further comprises a third bracket 150 that replaces the weld nuts of FIGS. 2 to 6. The third bracket 150 receives the fasteners 26 for securing the modified first and second brackets 120 and 122 to the outer and inner panel 30s 28 and 30, as will be described. Due to the similarity between the first modified truck bracket assembly 112 and the truck bracket assembly 12, identical components of the first modified truck bracket assembly 112 will receive the same reference numerals as the corresponding components of the truck bracket assembly 12. Modified components of the first modified truck bracket assembly 112 will receive the same reference numerals as the corresponding components of the truck bracket assembly increased by 100.

The modified first bracket 120 is supported to the outer panel 28 of the side panel 24. As best seen in FIGS. 2 and 4, the modified first bracket 120 includes a mounting portion 120A that is mounted to the side panel 24 of the truck bed 14. The mounting portion 120A has a shape that corresponds to the shape of the first portions 28A and 30A of the outer and inner panel 30s 28 and 30. The mounting portion 120A includes a pair of receiving openings R1 for receiving the fasteners 26 for securing the first modified truck bracket assembly 112 to the side panel 24. The modified first bracket 120 is essentially identical to the first bracket 20 except that the modified first bracket 120 includes an opening 156 for receiving part of the third bracket 150. The opening is preferably a slot 156 that is disposed beneath the receiving openings R1 and is spaced from the receiving openings that receive the fastener 26.

The modified second bracket 122 of the illustrated embodiment also contacts a pair of cantilevered surfaces of the truck bed 14. That is, the modified second bracket 122 is an L-shaped bracket that contacts the cantilevered surfaces of the inner panel 30 in a similar manner as that described for the second bracket 22 of FIGS. 1 to 6. Thus, the modified second bracket 122 is supported to the inner panel 30 of the side panel 24. The modified second bracket 122 is essentially identical to the second bracket 22, except that the modified second bracket 122 does not receive the fasteners 26.

As stated, the third bracket 150 receives the fasteners 26 and contacts the modified second bracket 122 so that the third bracket 150 supports the fasteners 26 to the modified second bracket 122. The third bracket 150 preferably includes a threaded opening 150A to receive the threaded portions 26A of the fasteners 26 therethrough. The fastener 26 extends through the modified first bracket 120 and the third bracket 150. The third bracket 150 has an extension 150B extending from the threaded opening 150A to the modified first bracket 120. The extension 150B has an end that is received in the slot 156 of the modified first bracket 120.

As shown, the fastener 26 is spaced from the modified second bracket 122 by a first distance D1. The fastener 26 is spaced from the end of the third bracket 150 by a second distance D2. The second distance D2 is greater than the first distance D1. Further, the modified second bracket 122 preferably directly contacts the inner panel 30. Alternatively, the first modified truck bracket assembly 112 can include a deformable member sandwiched between the modified second bracket 122 and the inner panel 30, similar to the first deformable member 52. In FIG. 7, the outer and inner panels 28 and 30 of the truck bed 14 have been modified to accommodate the first modified truck bracket assembly 112. In particular, the outer and inner panels 28 and 30 do not receive the fasteners 26 as in the outer and inner panels 28 and 30 of FIGS. 1 to 6.

Figure 8:
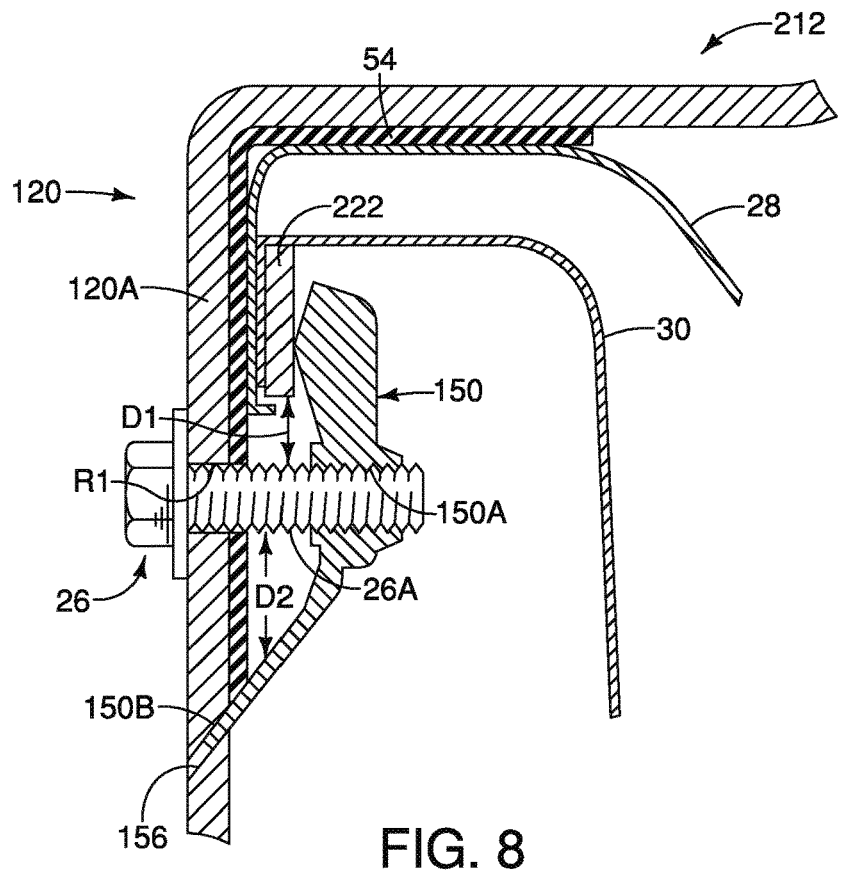
FIG. 8 is a cross-sectional view of a second modified truck bracket assembly.

Referring now to FIG. 8, a second modified truck bracket 212 assembly that can be provided to the vehicle 10 is illustrated. The second modified truck bracket 212 assembly is essentially identical to the first modified truck bracket assembly 112 except that the modified second bracket 122 is replaced with a fourth bracket 222. Otherwise, the second modified truck bracket 212 assembly comprises all of the same identical components as described for the first modified truck bracket assembly 112. The fourth bracket 222 is not L-shaped. The fourth bracket 222 preferably contacts a pair of cantilevered surfaces of the inner panel 30 (e.g., the first and second portions 30A and 30B of the inner panel 30).

Due to the similarity between the second modified truck bracket 212 assembly and the first modified truck bracket assembly 112, identical components of the second modified truck bracket 212 assembly will receive the same reference numerals as the corresponding components of the first modified truck bracket assembly 112.

General Interpretation of Terms

In understanding the scope of the present invention, the term "comprising" and its derivatives, as used herein, are intended to be open ended terms that specify the presence of the stated features, elements, components, groups and/or steps, but do not exclude the presence of other unstated features, elements, components, groups and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the truck bracket assembly. Accordingly, these terms, as utilized to describe the present invention should be interpreted relative to a vehicle equipped with the truck bracket assembly.

The term "configured" as used herein to describe a component, section or part of a device that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A truck bracket assembly comprising:
   a first bracket for mounting a sports bar to a side panel of a vehicle truck bed, the first bracket having a panel facing surface that faces the side panel; and
   a second bracket having a first portion supported to the panel facing surface of the first bracket, the second bracket having a second portion extending cantilevered with respect to the first portion, the panel facing surface of the first bracket has at least one first opening, the first portion of the second bracket has at least one second opening that corresponds to the at least one first opening.

2. The truck bracket assembly according to claim 1, wherein
   the first bracket has a sports bar support portion extending cantilevered with respect to the panel facing surface, the sports bar support portion extending in the same direction that the second portion of the second bracket extends from the first portion.

3. The truck bracket assembly according to claim 1, further comprising
   at least one fastener extending to the at least one first opening and the at least one second opening.

4. The truck bracket assembly according to claim 3, further comprising
   at least one weld nut that is welded to the second bracket, the at least one weld nut receiving the at least one fastener.

5. A vehicle comprising:
   a truck bed having a side panel that includes an inner panel and an outer panel;
   a first bracket that is supported to the outer panel of the side panel; and
   a second bracket that is supported to the inner panel of the side panel, the second bracket abuts a pair of cantilevered surfaces of the inner panel including a downward facing surface of the inner panel that faces in a downward direction to contact the second bracket.

6. The vehicle according to claim 5, wherein
   an interior portion of the inner panel and an interior portion of the outer panel are sandwiched between the first and second brackets.

7. The vehicle according to claim 6, wherein
   an exterior portion of the inner panel and an exterior portion of the outer panel extend in a vehicle outward direction away from the first and second brackets.

8. The vehicle according to claim 6, wherein
   the second bracket is positioned between the interior portion and the exterior portion of the inner panel.

9. The vehicle according to claim 5, further comprising
   a fastener extending through the inner panel, the outer panel, the first bracket and the second bracket to support the first and second brackets to the side panel.

10. The vehicle according to claim 9, further comprising
    a weld nut for receiving the fastener, the weld nut being welded to the second bracket.

11. The vehicle according to claim 5, wherein
    the second bracket has a first portion that directly contacts the inner panel, the second bracket has a second portion extending cantilevered with respect to the first portion.

12. The vehicle according to claim 5, further comprising
    a fastener extending through the first bracket, the fastener being spaced from the second bracket.

13. The vehicle according to claim 12, further comprising
    a third bracket that receives the fastener and contacts the second bracket so that the third bracket supports the fastener to the second bracket.

14. A vehicle comprising:
    a truck bed having a side panel that includes an inner panel and an outer panel;
    a first bracket that is supported to the outer panel of the side panel; and
    a second bracket that is supported to the inner panel of the side panel, the second bracket contacts a pair of cantilevered surfaces of the inner panel
    the second bracket has a first portion that directly contacts the inner panel, the second bracket has a second portion extending cantilevered with respect to the first portion; and
    a deformable member sandwiched between the second portion of the second bracket and the inner panel to secure the second portion to the inner panel.

15. The vehicle according to claim 14, wherein
    an interior portion of the inner panel and an interior portion of the outer panel are sandwiched between the first and second brackets.

16. The vehicle according to claim 15, wherein
    an exterior portion of the inner panel and an exterior portion of the outer panel extend in a vehicle outward direction away from the first and second brackets.

17. The vehicle according to claim 16, wherein the second bracket is positioned between the interior portion and the exterior portion of the inner panel.

18. The vehicle according to claim 17, wherein the deformable member is sandwiched between the second portion of the second bracket and the exterior portion of the inner panel.

\* \* \* \* \*